Aug. 12, 1958

W. H. GOODWIN 2,846,690

PROSTHETIC HINGE STRAP

Filed Dec. 26, 1956

WALTER H. GOODWIN,
INVENTOR.

HUEBNER, BEEHLER,
WORREL & HERZIG,
ATTORNEYS.

United States Patent Office 2,846,690
Patented Aug. 12, 1958

2,846,690

PROSTHETIC HINGE STRAP

Walter H. Goodwin, Sierra Madre, Calif., assignor to Sierra Engineering Co., Sierra Madre, Calif., a corporation of California Application December 26, 1956, Serial No. 630,654

6 Claims. (Cl. 3—12.2)

The invention herein disclosed relates to prosthetic appendages and has particular reference to a joint such as might be used in attaching a portion of a prosthetic arm or leg member to the residual portion of the arm or leg on the body of the user.

While considerable research and attention has been directed to mechanisms for prosthetic joints during the past decade, certain of the more elemental portions of the structure have been permitted to become standardized in forms which to a degree have been unsatisfactory. Among the troublesome features of devices heretofore employed has been the necessity of springing straps which, for example, hold the prosthetic forearm to the elbow butt in order to engage the straps non-rotatably upon a hinge pin in the butt which has resulted in a considerable degree of misalignment due to distortion of the parts during assembly. Because of this feature every time the joint needs to be separated for servicing, defects resulting from strain on any of the parts have been considerably exaggerated.

It is therefore among the objects of the invention to provide a new and improved hinge structure for a prosthetic joint which is sufficiently simple and direct in its structure and relationship of parts that it can be assembled without strain upon any of the several pieces.

Another object of the invention is to provide a new and improved hinge structure for prosthetic joints, interconnecting parts of which can be slipped one over the other without there being any binding and which when once slipped into place can there be firmly locked in assembled relationship by a direct acting lock mechanism which is extremely firm in operative condition but which can be readily disengaged whenever the joint needs separation without producing any strain upon any of the parts.

Still another object of the invention is to provide a new and improved hinge structure for prosthetic joints wherein the structure and relationship of parts is such that there need be no prospect of misalignment of moving parts during assembly or disassembly and which at the same time is rugged and also compact to the extent that the outside contour of the structure is relatively smooth and devoid of unwanted protrusions or configurations.

With these and other objects in view, the invention consists in the construction, arrangement and combination of the various parts of the device whereby the objects contemplated are attained, as hereinafter set forth, pointed out in the appended claims and illustrated in the accompanying drawings.

Figure 1:
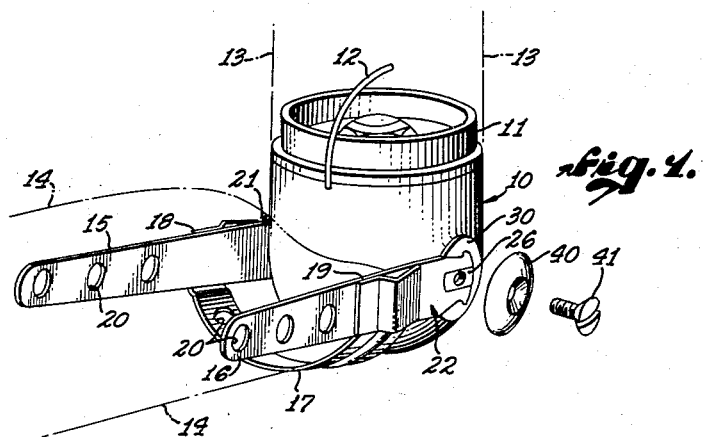
Figure 1 is a front perspective view of a prosthetic joint structure incorporating the hinge.

In one embodiment chosen for the purpose of illustration there is shown an elbow joint comprising a butt member 10 which is adapted to house appropriate conventional mechanism for limiting the angular position of one side of the joint relative to the other. A flange 11 on the butt member is provided to facilitate in the chosen example attachment of the butt member to the stub of the upper arm. A conventional control cable 12 is suggested in the position it would normally occupy for manipulating the joint. The upper arm is suggested by the broken line 13.

A prosthetic forearm illustrated by the dash lines 14 represents the part which needs to be attached to the butt member 10. For this purpose there is provided a hinge strap assembly indicated generally by the reference character 14 which comprises spaced parallel side elements 15 and 16 joined together by means of an arcuate connecting strap 17 joined at points 18 and 19, respectively, to the side elements 15 and 16. Holes 19 and 20 may be provided for making some suitable mechanical attachment to the prosthetic forearm.

Ends 21 and 22, respectively, of the side elements are alike as to structure and configuration sufficient that a description of one and its attachment to the butt member 10 is deemed sufficient.

The end 22 by way of example has formed therein an open end slot 23 having opposite parallel walls. A pin 24 which extends through a transverse passage 25 in the butt has at each of its outer ends a projection like the projection 26. The projection has the same shape as the slot 23 to the extent of being provided with opposite parallel walls 27 and 28. The projection fits within the slot 23 with a degree of tolerance permitting a free-sliding but relatively snug fit. Clearly, therefore, once the hinge strap assembly has the ends of the side elements in engagement with the projections, the hinge strap assembly will be keyed to the pin 24.

To effectively retain the parts thus described in keyed relationship, there is provided a lock-on washer 30. The lock-on washer has an end opening recess 31 and is possessed of an irregular configuration, both sides of the recess being the same in the example chosen. As there shown the recess includes an inwardly extending rounded protrusion 32 adjacent to which is an outwardly extending concave hollow 33.

On the exterior of the end 22 of the side element 16 is a perimeter, the shape of which is complementary to the shape of the recess 31 in that a hollow 34 is adapted to receive within it the protrusion 32 and a protrusion 35 is adapted to extend into the hollow 33. In a further particular these nesting portions are specially formed to the extent that there is an outwardly sloping bevel 36 at the perimeter of the end 22 and a corresponding inwardly sloping bevel 37 at the perimeter of the recess 31.

To anchor the parts in the positions shown and described there may be provided a hold-on washer 40, the circumference of which substantially coincides with the exterior circumference of the lock-on washer 30. A screw 41 having a threaded engagement 42 with the pin 24 is adapted to draw the hold-on washer 40 against the lock-on washer 30 forcing the bevels over each other, thereby to provide a particularly snug and positive fit of the lock-on washer over the end 22 of the side element 16 configured to the degree described.

When the hinge strap assembly in the condition it has when attached to a forearm is to be mounted on the butt, the screws 41 and hold-on washers 40 are removed. The slot 23 in the end 22 is then slid freely over the projection 26 in each instance and once in position the lock-on washer 30 is applied over the face of the end 22. A bottom edge 43 of the recess 31 is adapted to bear against a rounded end 44 of the projection thereby to assist in fixing the position of the lock-on washer with respect to the projection. The lock-on washer will interlock with the end 22. This interlock, as previously described, is anchored in the relationship shown by application of the hold-on washer 40 and screw 41 on each side. Should it be necessary to remove the hinge strap assembly, the only operation required is to remove the screws 41 and hold-on washers 40, at which time pressure is relieved upon the lock-on washer 30 which can be lifted from interlocked or nested position and the hinge strap slid off the projection 26.

Figure 3:
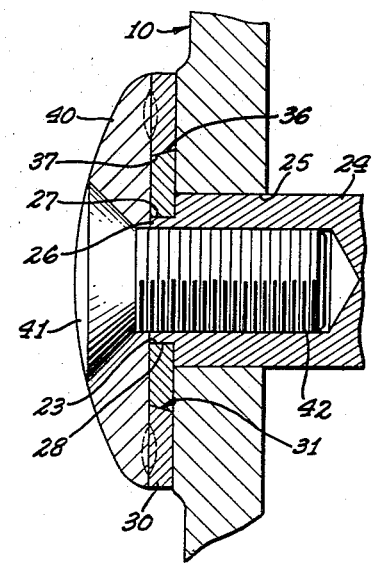
Figure 3 is a fragmentary longitudinal sectional view of one side of the hinge structure.
Figure 4:
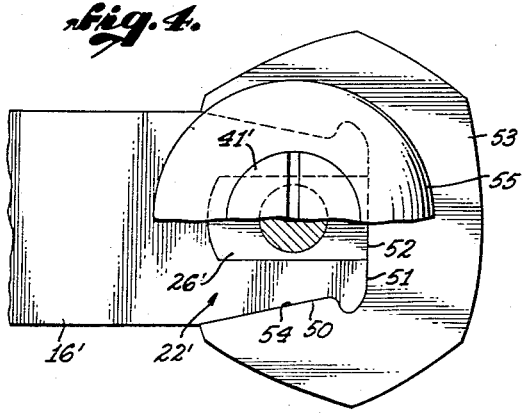
Figure 4 is a side view partially in section similar to Figure 2 but illustrating a somewhat different configuration of parts.

In Figure 4 a somewhat modified structure is shown wherein a side element 16' has an end 22' provided with a somewhat different configuration 50 which, if desired, may not be bevelled as illustrated in Figure 3. As shown an end face 51 is flat and is adapted to coincide with a flat side 52 of a projection 26'.

Figure 2:
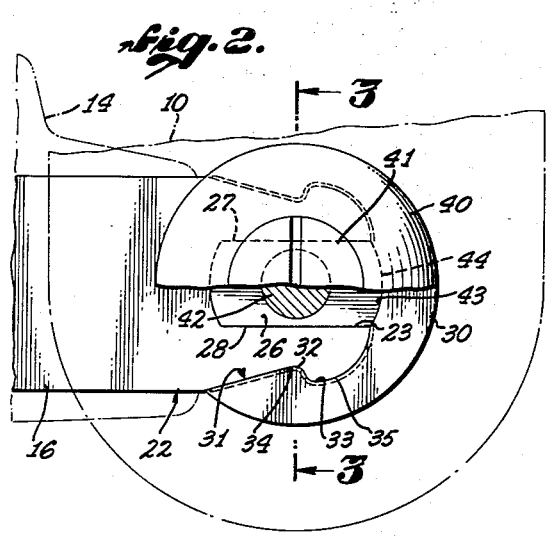
Figure 2 is a side view partially in section showing the parts in assembled condition.

In this form a lock-on washer 53 has a recess 54 complementary to the configuration 50 at the perimeter of the end 22' and is adapted to interlock therewith in the same manner as described in connection with Figures 1, 2 and 3.

As a convenience and to reduce the number of individual parts a camming washer 55 may be spot welded or otherwise secured to the lock-on washer 53. The parts 53 and 55, therefore, may be applied together over the end 22' and to hold them in place a screw 41' may be inserted through the camming washer and lock-on washer as previously described and engaged in similar fashion with a pin 24' upon which the projection 26' is mounted.

There has accordingly been described a particularly effective and simply constituted securing means whereby a hinge strap assembly for a forearm may be interlocked with a pin in the butt joint normally attached to the upper arm in such fashion that the installation can be made easily and directly without necessity of distorting any of the parts. The principle is one which accomplishes a snug fit in which tolerances are taken up and as a lock-on principle is readily adapted to prosthetic joints of this kind where similar requirements are found.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A prosthetic joint comprising a butt adapted for attachment to the limb of a user, a hinge strap adapted to be secured to a prosthetic limb and comprising spaced parallel side elements and a connection therebetween, a pin extending through the butt, a projection at each end of the pin having at least one straight side, ends of said side elements each having a slot with at least one straight side and adapted to slide endwise over the respective projection, outside edges of each said end having an irregular configuration, a lock-on element for each end having an open end recess complementary to the respective irregular configuration and adapted to fit thereon, a hold-on element on each side adapted to overlie the lock-on element and a securing member on each side extending through said elements and said end into engagement with the pin.

2. A prosthetic elbow joint comprising a butt including an upper end adapted for attachment to the upper arm, a hinge strap adapted to be secured to a prosthetic lower arm and comprising spaced parallel side elements and a connection between said side elements, a pin extending through the butt, a projection at each end of the pin having straight sides, an end of each side element having slots with straight sides adapted to slide endwise over said projections, outside edges of each said end having an irregular configuration, a lock-on element for each said end having an open end recess complementary to the respective irregular configuration and adapted to fit thereon, a hold-on element on each side adapted to overlie the lock-on element and a screw on each side extending through said elements and said end into threaded engagement with the pin.

3. A prosthetic elbow joint comprising a hollow butt adapted to simulate a human elbow structure and including an upper end adapted for attachment to the upper arm, means forming a transverse passage through said butt, a hinge strap adapted to be secured to a prosthetic lower arm and comprising spaced parallel side elements and an arcuate connection between said side elements intermediate ends thereof, a pin extending through the passage in the butt, a projection at each end of the pin having straight parallel sides, ends of said side elements having slots with straight parallel sides adapted to slide endwise over said projections, outside edges of each said end having a bevelled irregular configuration, a lock-on washer for each end of the pin having an open-end bevelled recess complementary to the respective irregular configuration and an exposed side of the projection and adapted to fit on said irregular configuration, a hold-on washer on each side having a size adapted to overlie the lock-on washer and a screw on each side extending through said washers and said end into threaded engagement with the pin.

4. A hinge joint for a prosthetic elbow structure comprising a forearm hinge strap having opposite side elements, at least one of said side elements having an open end slot with opposite straight sides, a pin, a projection at at least one end of the pin having opposite straight sides adapted to receive the slot on said one side element in non-rotatable engagement, an end on said one side element having a perimeter and said perimeter having an irregular shape, a lock-on washer having a recess complementary in shape to the perimeter of said end, and means adapted to retain said end, said lock-on washer and said projection in engagement comprising a holding member overlying said lock-on washer and a screw on said holding member adapted to threadedlly engage the pin.

5. A hinge joint for a prosthetic elbow structure comprising a forearm hinge strap having opposite side elements, at least one of said side elements having an open end slot with opposite straight sides, a pin, a projection at at least one end of the pin having opposite straight sides adapted to receive the slot on said one side element in non-rotatable engagement, an end on said one side element having a beveled perimeter and said perimeter having an irregular shape, a lock-on washer having a recess complementary in shape to the perimeter of said end and said recess having a bevel complementary to the beveled perimeter of said end, and means adapted to retain said end, said lock-on washer and said projection in engagement comprising a holding member overlying said lock-on washer and a screw on said holding member adapted to threadedly engage the pin.

6. A hinge joint for a prosthetic elbow structure comprising a forearm hinge strap having opposite side elements, at least one of said side elements having an open end slot with opposite straight parallel sides, a pin, a projection at at least one end of the pin having opposite straight parallel sides adapted to receive the slot on said one side element in non-rotatable engagement, an end on said one side element having a beveled perimeter and said perimeter having an irregular shape on opposite sides of said slot, a lock-on washer having an end opening recess complementary in shape to the perimeter of said end and said recess having a bevel complementary to the beveled perimeter of said end, and means adapted to retain said end, said lock-on washer and said projection in engagement comprising a disc overlying said lock-on washer and a screw on said disc adapted to threadedly engage the pin.

References Cited in the file of this patent

UNITED STATES PATENTS 2,784,416　　Goodwin et al. _____ Mar. 12, 1957